United States Patent
Sethuram et al.

(10) Patent No.: US 7,110,423 B1
(45) Date of Patent: Sep. 19, 2006

(54) METHOD AND SYSTEM FOR SOURCE SYNCHRONOUS CLOCKING

(75) Inventors: Jay Sethuram, Saratoga, CA (US); Richard J. Weber, Mountain View, CA (US); Joshi S. Chandra, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/450,802

(22) Filed: Nov. 29, 1999

(51) Int. Cl.
*H04L 7/10* (2006.01)

(52) U.S. Cl. .................................................. 370/519

(58) Field of Classification Search ............ 370/395.4, 370/395.62, 503, 507, 519, 517, 508; 375/240.28, 375/354, 355, 356, 359; 714/707, 731, 744, 714/775, 789
See application file for complete search history.

(56) References Cited

U.S. PATENT DOCUMENTS

| | | | | |
|---|---|---|---|---|
| 5,619,499 A | | 4/1997 | Nakabayashi | ............... 370/469 |
| 5,668,810 A | * | 9/1997 | Cannella, Jr. | ............... 370/392 |
| 5,748,018 A | * | 5/1998 | Ishikawa | ................... 327/154 |
| 5,854,840 A | * | 12/1998 | Cannella, Jr. | .................. 380/9 |
| 6,029,202 A | * | 2/2000 | Frazier et al. | .............. 709/232 |
| 6,058,427 A | | 5/2000 | Viswanath et al. | ......... 709/231 |
| 6,141,352 A | | 10/2000 | Gandy | ........................ 370/463 |
| 6,192,028 B1 | | 2/2001 | Simmons et al. | ........... 370/229 |
| 6,195,597 B1 | * | 2/2001 | Yamada | ......................... 701/1 |
| 6,345,052 B1 | | 2/2002 | Tse et al. | ................. 370/395.6 |
| 6,356,557 B1 | * | 3/2002 | Nichols et al. | ............. 370/449 |

* cited by examiner

*Primary Examiner*—Ricky Q. Ngo
*Assistant Examiner*—Duc Duong
(74) *Attorney, Agent, or Firm*—Campbell Stephenson Ascolese LLP

(57) ABSTRACT

A source synchronous clocking synchronizes data and clock signals transmitted between an ATM layer and a link layer. The source synchronous clocking includes a source clock domain in a first layer which includes a register having a first input for receiving a data signal, a second input for receiving a clock signal, and an output; and a buffer having an input for receiving the clock signal and an output, the buffer generating a delay that is substantially equivalent to a delay through the register. The source synchronous clocking further includes a destination clock domain in a second layer which includes a register having a first input and a second input, the first input of the register of the destination clock domain being coupled to the output of the register in the source clock domain.

22 Claims, 3 Drawing Sheets

METHOD AND SYSTEM FOR SOURCE SYNCHRONOUS CLOCKING

BACKGROUND INFORMATION

1. Field of the Invention

The invention relates to the field of telecommunication networks, and particularly, to Asynchronous Transfer Mode (ATM) interfaces between different communication layers.

2. Description of Related Art

As telecommunication networks companies design faster communication interfaces, the margin of error in synchronizing signals becomes narrower. Conventional interfaces use a clocking mechanism where receive and transmit clocks are driven from the ATM layer to the physical (PHY) layer. Examples of such interfaces include prior adopted or proposed Universal Test and Operation Physical Layer Protocol Interface for ATM (UTOPIA). Such clocking technique suffices for clock rate operation specified for earlier UTOPIA interfaces.

In a source synchronous interface, a transmit clock signal from a link layer operates as a reference clock for all signals transmitted from the link layer to the PHY layer. A receive clock signal from the PHY layer operates as a reference clock for all the signals transmitted from the PHY layer to the link layer. As a result, receive flow control signals that originate from the link layer are re-synchronized to the transmit clock before transmission to the PHY layer. Similarly, transmit control signals that originate from PHY layer are re-synchronized to the receive clock prior to the transmission to the link layer.

In a proposed UTOPIA Level 4 interface, systems operation is expected to operate at frequencies in excess of 200 MHz, with a bandwidth of over 10 Gbps (giga bit per second). As the frequency of a clock rate increases to above 200 MHz, internal delays on a board caused by secondary delays such as layout and dielectric constants can affect meeting set up time and hold time at endpoints. Consequently, circuit designers are confronted with challenges in resolving asynchronous clock and data signals.

Accordingly, it is desirable to have a method and system for synchronizing clock and data signals from a source clock in ATM interfaces.

SUMMARY OF THE INVENTION

The invention provides a source synchronous clocking for synchronizing data and clock signals transmitted between an ATM layer and a link layer. The source synchronous clocking includes a source clock domain in a first layer having a register with a first input for receiving a data signal, a second input for receiving a clock signal, and an output; and a buffer having an input for receiving the clock signal and an output, the buffer generating a delay that is substantially equivalent to a delay through the register. The source synchronous clocking further includes a destination clock domain in a second layer having a register with a first input and a second input, the first input of the register of the destination clock domain being coupled to the output of the register in the source clock domain.

Advantageously, the source synchronous clocking provides more accurate recovery of transmitted data over a network. Additionally, this source synchronous clocking system advantageously eliminates the need for a phase-locked-loop to ensure clock and data synchronization between the ATM layer and the PHY layer. Furthermore, the source synchronous clocking discounts chip input and output delays.

DETAILED DESCRIPTION

Figure 1:
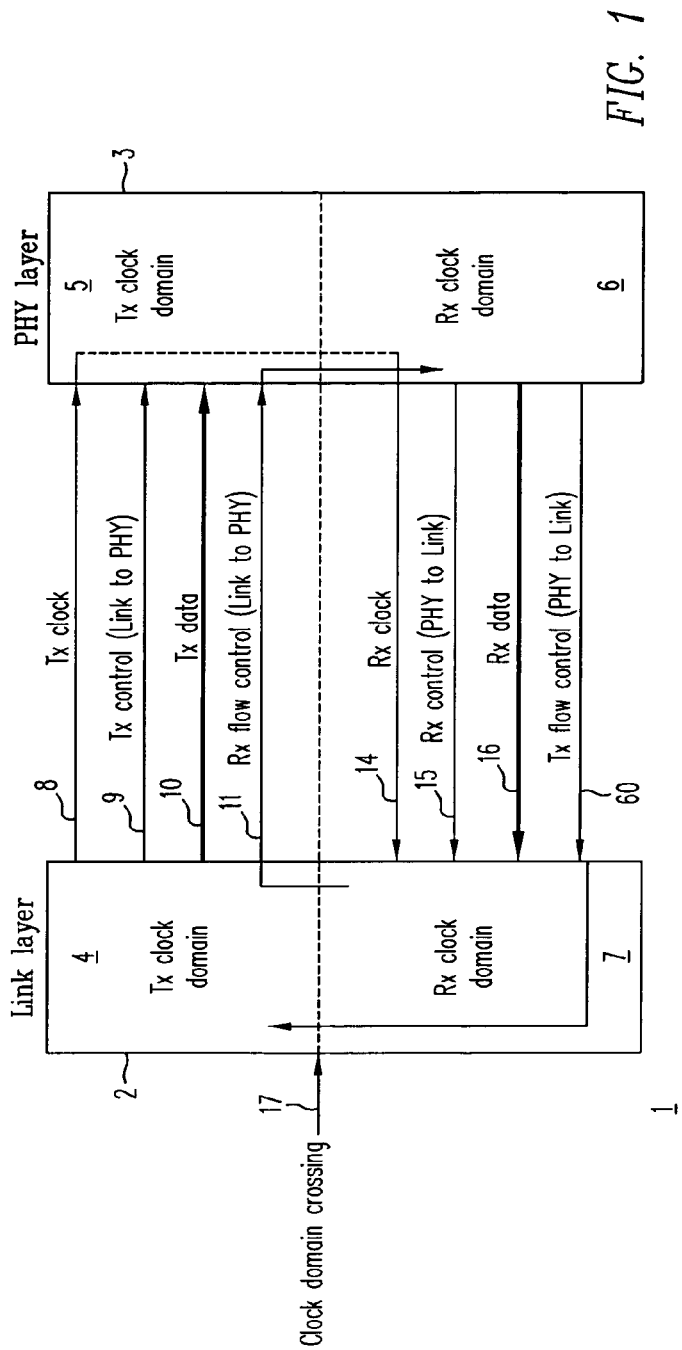
FIG. 1 is a general block diagram illustrating transfer of signals from a link layer to a PHY layer using a source synchronous clocking in accordance with the present invention.

FIG. 1 is a block diagram of a source synchronous clocking system 1 for transferring signals between a link layer 2 to a PHY layer 3. The source synchronous clocking system 1 comprises a transmit (Tx) clock domain 4 and a receive (Rx) clock domain 7 in the link layer 2, and a transmit clock domain 5 and a receive clock domain 6 in the PHY layer 3. The link layer 2 comprises an ATM layer or frame layer. From the link layer 2 to the PHY layer 3, the following signals are transferred: a transmit clock 8, a transmit control 9, a transmit data 10, and a receive flow control 11. From the PHY layer 3 to the link layer 2, the following signals are transferred: a receive clock 14, a receive control 15, a receive data 16, and a transmit flow control 60.

The source synchronous clocking system 1 transfers information in two directions, a transmit direction and a receive direction. In the transmit direction, there is a transmit source which comprises a transmit clock domain 4 and a transmit destination which comprise a transmit clock domain 5. The transmit control signal 9 comprises control information for transmitting data to the PHY layer 3, such as indicating a start of transmission and an end of transmission. The receive flow control 11 is transmitted to the transmit clock domain 5 using the receive clock 14 from the receive clock domains 6 and 7 because the receive flow control 11 cannot be sent through the receive clock domain 7 due to source synchronous clocking. In the receive direction, there is a receive source which comprises a receive clock domain 6 and a receive destination which comprises a receive clock domain 7. The receive clock 14 can be coupled to the transmit clock 8 for triggering the receive clock 14 by the transmit clock 8.

The transmit clock domain 4 in the link layer 2 comprises a central clocking source that sources the clocks both on the transmit and the receive. A clock domain crossing 17 is represented by the dotted lines across the link layer 2 and the PHY layer 3. The transmit clock domain 4 in the link layer 2 and the receive clock domain 7 in the link layer 2 can be implemented on a single integrated circuit chip or as a separate integrated circuit chip. The transmit clock domain 5 in the PHY layer 3 and the receive clock domain 6 in the PHY layer 3 can also be implemented on an integrated circuit chip or as a separate integrated circuit chip. On a printed circuit board, the integrated circuit chip on the link layer 2 communicates with another integrated circuit chip on the PHY layer 3.

Figure 2:
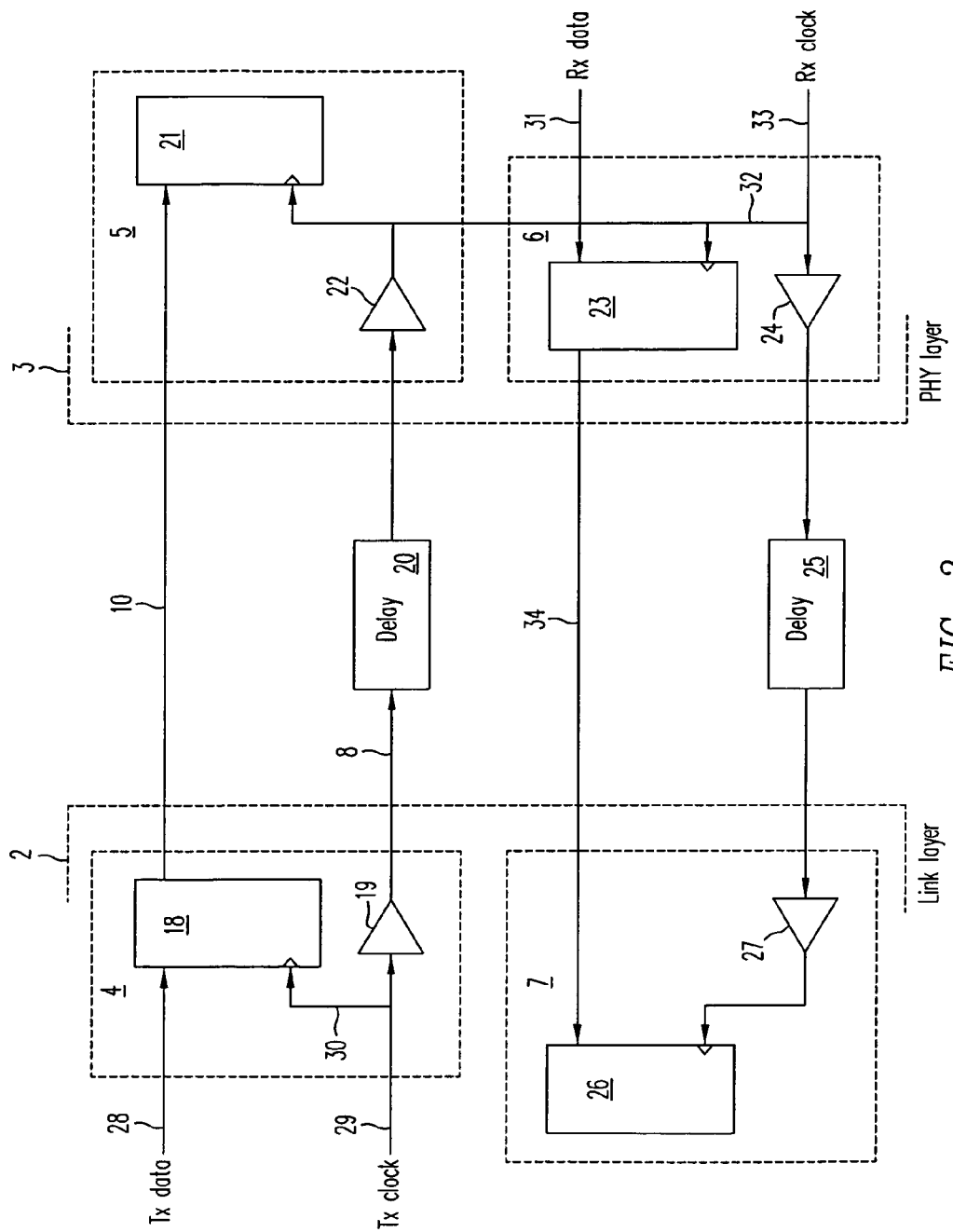
FIG. 2 is a logic diagram illustrating the source synchronous clocking from a link layer to a PHY layer in accordance with the present invention.

FIG. 2 is a logic diagram of the source synchronous clocking system 1 from the link layer 2 to the PHY layer 3. The transmit clock domain 4 from the link layer 2 is coupled to the transmit clock domain 5 to the PHY layer 3 through a line 10 and a delay buffer 20. Each of the transmit clock domains 4 and 5 comprises a register 18 and a buffer 19, and a register 21 and a buffer 22, respectively. A transmit clock 29 is coupled to both the input of the buffer 19 and the input of the register 18 to ensure that the clocking for the register 18 and the buffer 19 are triggered from the transmit clock 29. The register 18 has a second input for receiving transmit data 28 such that the transmit data 28 passes through the register 18 when the transmit clock 29 triggers through the first input of the register 18. The buffer 19 is selected to produce a delay which is equivalent to the propagation delay through the register 18 so that the output from the register 18 is synchronized with the output from the delay buffer 19. The propagation delay through the register 18 is the same as the delay through the delay buffer 19. However, if the transmit clock 29 arrives at a different time than the transmit data, an external delay 20 is introduced to the transmit clock 29 to ensure that the transmit data 28 and the transmit clock 29 reaches the receiving end, i.e. the transmit clock domain 5, synchronously with one another.

The transmit clock 29 is delayed by the delay buffer 19 so that the transmit clock 29 is synchronized with the transmit data 28 when the transmit data 28 exits from the transmit clock domain 4 onto the line 10. The buffer 22 in the transmit clock domain 5 is optional. The register 21 receives the transmit data 28 from the line 10 and has a second input for receiving the clock signal from the output of the buffer 23.

Optionally, the clock output from the buffer 22 from the transmit clock domain 5 can be connected to with a receive clock 33 of the receive clock domain 6. As a result, the requirement of synchronizing the transmit data 29 with the receive data 33 is eliminated since the same clock is used for both the transmit data 29 in the transmit block domain 5 and the receive data 33 in the receive clock domain 6. The merging of the transmit clock 29 and the receive clock 33 ensure that the number of clock cycles on the transmit side match those on the receive side for receive flow control 11 and transmit flow control 17.

The receive clock domain 6 is coupled to the receive clock domain 7 through a delay 25 and a line 34. Each of the receive clock domains 6 and 7 comprises a register 23 and a buffer 24, and a register 26 and a buffer 27, respectively. The receive clock 33 couples to both the input of the buffer 24 and the input of the register 23 to ensure that the clocking for the register 23 and the buffer 24 are triggered from the receive clock 33. The register 23 has a second input for receiving receive data 31 such that the receive data 31 is clocked by the receive clock 33. The buffer 24 is selected to produce a delay which is equivalent to the propagation delay through the register 23 so that the output from the register 23 is synchronized with the output from the buffer 24. The propagation delay through the register 23 is the same as the delay through the buffer 24. However, if the receive clock arrives at a different time than the receive data 31, an external delay 25 is introduced to the receive clock 33 so that the receive data 31 and the receive clock 33 reaches the receiving end, i.e. the receive clock domain 7, synchronously with one another.

The receive clock 33 is delayed through the buffer 24 so that the receive clock is synchronized with the receive data when the receive data 31 exits from the receive clock domain 6 onto the line 34. The delay buffer 27 in the receive clock domain 7 is optional. The register 26 receives the output data from the register 23 and has a second input for receiving the clock signal from the output of the buffer 27.

Figure 3:
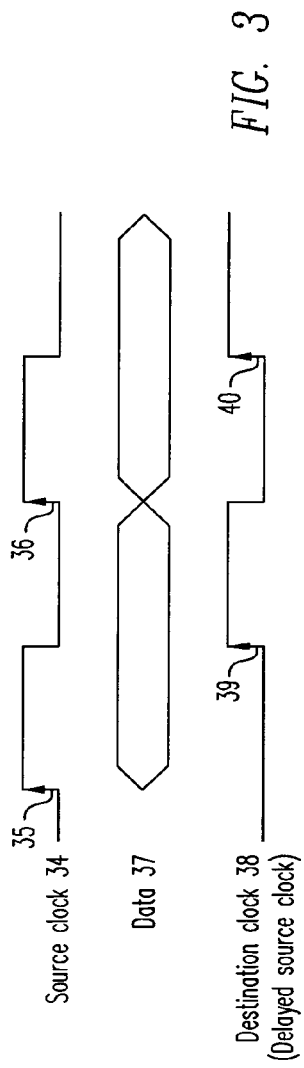
FIG. 3 is a timing diagram illustrating the source synchronous clocking that accounts for re-synchronization latency in accordance with the present invention.

FIG. 3 is a timing diagram of the source synchronous clocking system 1 that accounts for re-synchronization latency. Due to re-synchronization delays in control signals between the different clock domains, latency may be injected before changes in control signals are detected. For example, during the transmit, when the register 13 of the PHY layer 3 is full, the PHY layer 3 notifies the link layer 2 to stop transmitting until the PHY layer 3 is ready to accept more transfers. Since the link layer 2 encounters a certain amount of latency before detecting the full condition, the PHY layer 3 sustains a few more transfers before the link layer 2 responds to this condition and halts any further transmissions.

The top timing diagram shows a source clock 34 triggering on a rising edge 35 and a rising edge 36. The middle timing diagram illustrates the data transitions 37, such as the transmit data or the receive data. The source clock 34 diagram does not correspond directly with the data 37 diagram since the source clock 34 triggers at a time when the data 37 is invalid. To rectify this situation, the bottom diagram shows a destination clock 38 where a source clock is artificially delayed to trigger at an appropriate time when the data is valid. The destination clock 38 triggers a rising edge 39 and a rising edge 40 at a time when the data 38 is valid.

Figure 4:
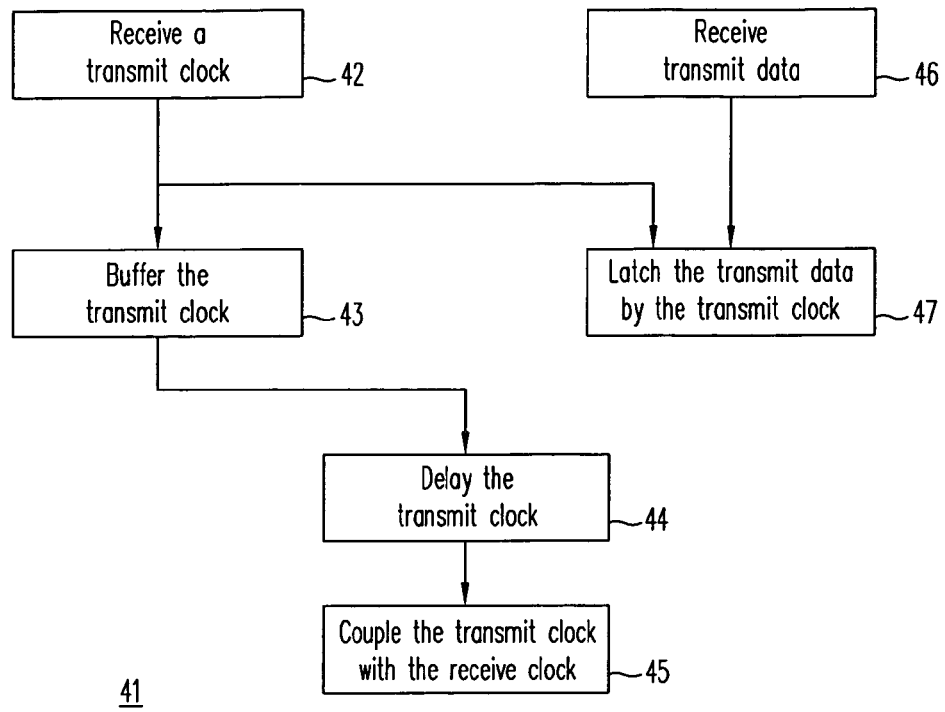
FIG. 4 is a flow chart illustrating the source synchronous clocking in accordance with the present invention.

FIG. 4 is a flow chart of a source synchronous clocking method 41. The register 18 in the transmit clock domain 4 receives 42 the transmit clock 42. The register 18 in the transmit clock domain 4 receives 46 the transmit data 28. The register 18 latches 47 the transmit data 28 upon triggering by the transmit clock 29. The buffer 19 in the transmit clock domain 4 buffers 43 the transmit clock 29 by a specified delay that is substantially equivalent to the propagation delay through the register 18 so that the output from the register 18 and the output from the buffer 9 are synchronized. The delay 20 injects 44 additional delay into a line 8 of the transmit clock 29, if necessary, to synchronize the transmit data 28 and the transmit clock 29 at the transmit clock domain 5 the PHY layer 3. Optionally, the output of the buffer 23 couples 45 the transmit clock 29 with the receive clock 33 in the receive clock domain 6 of the PHY layer 3.

Figure 5:
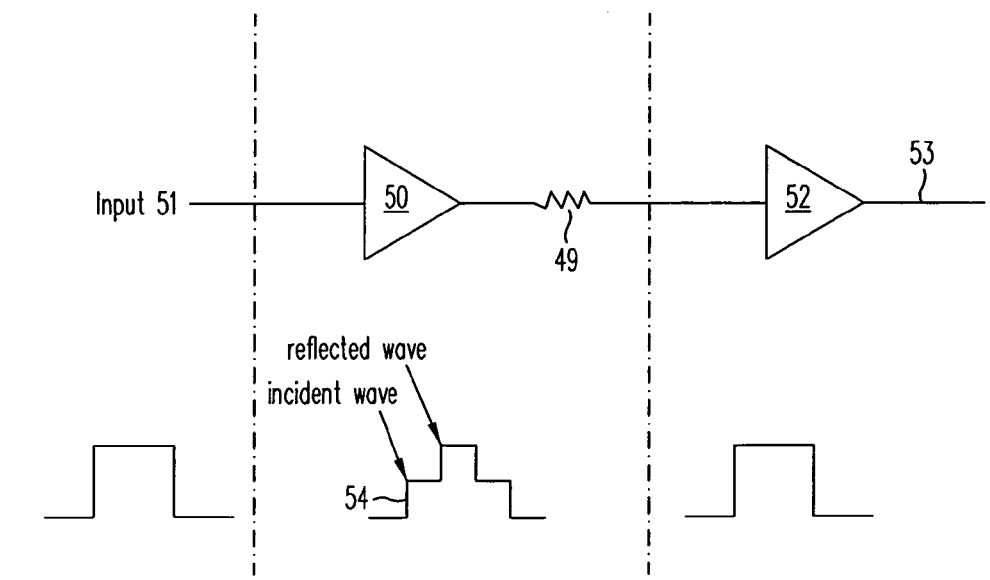
FIG. 5 is a circuit diagram illustrating a series termination in accordance with the present invention.

FIG. 5 is a circuit diagram of a source termination implemented with a series termination circuit 48. The source termination circuit 48 places a load 49 near a source generator 50 while places no termination near a receiver 52. When an input signal 51 reaches a termination point, the input signal 51 is reflected back because there are no termination load at a termination point 54. The load 49 near the source generator 50 absorbs the reflected back signal. Consequently, the resulting signal has one reflection. A signal waveform for the source termination has a step-up ladder type of effect 54, with the first step-up as an incident wave and the second step-up as reflected wave. For point-to-point signals, the source series termination 48 provides a means to absorb the incident wave reflected back from the far end. When matching the input and output driver's source impedance to the impedance attributable to the signal trace on the board, the remote receiver observes a "full rail" signal, and the reflections from the far end are terminated at the driver. The source series termination 48 improves the signal integrity, while at the same time reduces the power consumption by minimizing the power dissipation.

Advantageously, the series termination circuit 48 has an edge rate that is slowed down to reduce EMI injections. Another advantage of embedding the source termination circuit 48 within the transmitter is that an external termination is unnecessary and thus eliminated. The source termination circuit 48 is build-in as part of the transmit clock domain or the receive clock domain. The series termination is matched to the impedance of the traces on a PC board, which is typically 50 ohms.

Optionally, the data and control signals are multiplexed at different time slots for controlling the type of data. The control signals are multiplexed or shared as part of the datapath. Although the multiplexed data and control signals require additional bandwidth, this option reduces the total pin counts. An additional signal may be used to indicate whether the data path is transmitting the control signal or data signal information.

Foregoing described embodiments of the invention are provided as illustrations and descriptions. They are not intended to limit the invention to precise form described. In particular, Applicant contemplates that functional implementation of invention described herein may be implemented equivalently in hardware, software, firmware, and/or other available functional components or building blocks. For example, the concept and implementation of the source synchronous clocking system and method are equally applicable to other feedback signals that operate at high frequencies. Other variations and embodiments are possible in light of above teachings, and it is thus intended that the scope of invention not be limited by this Detailed Description, but rather by Claims following.

I claim:

1. A source synchronous clocking system, comprising:
   a source clock domain in a first network protocol layer, comprising:
      a register having a first input for receiving a data signal, a second input for receiving a clock signal, and an output; and
      a buffer having an input for receiving the clock signal and an output, said buffer generating a delay that is substantially equivalent to a delay through said register; and
   a destination clock domain in a second network protocol layer, comprising:
      a register having a first input and a second input, the first input of said register of said destination clock domain being coupled to the output of said register in the source clock domain, wherein
         said first network protocol layer comprises one of: a link layer and a PHY layer.

2. The source synchronous clocking system of claim 1 wherein said source clock domain comprises a first transmit clock domain in the first network protocol layer for transmitting the data and clock signals to said destination clock domain that comprises a transmit clock domain in the second network protocol layer, said first network protocol layer comprising said link layer, said second network protocol layer comprising said PHY layer.

3. The source synchronous clocking system of claim 1 wherein said source clock domain comprises a first receive domain in said first network protocol layer for transmitting data and clock signals to said destination clock domain that comprises a receive clock domain in said second network protocol layer, said first network protocol layer including said PHY layer, said second network protocol layer including said link layer.

4. The source synchronous clocking system of claim 1 further comprising a delay circuit, coupled between said source clock domain and said destination clock domain, for introducing additional delay to the clock signal.

5. The source synchronous clocking system of claim 1 further comprising a serial termination circuit for absorbing a reflection generated by the data signal.

6. The source synchronous clocking system of claim 1 further comprising a parallel termination circuit for absorbing a reflection generated by the data signal.

7. The source synchronous clocking system of claim 1, wherein the link layer is an Asynchronous Transfer Mode (ATM) layer.

8. A method for operating a source synchronous clocking system between a first layer and a second layer from a source clock, comprising:
   receiving an input clock signal in a first clock domain in a first layer, wherein the first layer comprises one of: a link layer and a PHY layer;
   receiving an input data signal in the first clock domain in the first layer;
   latching the input data signal in response to the input clock signal;
   delaying the input clock signal by an amount that is equal to the delay in the latching; and
   generating an output clock signal and an output data signal in the second clock domain in the second layer, the output clock signal and the output data signal being synchronized to each other.

9. The method of claim 8 wherein the first layer comprises the link layer and the second layer comprises the PHY layer, the input clock and data signal being transferred from the link layer to the PHY layer.

10. The method of claim 8 wherein the first layer comprises the PHY layer and the second layer comprises the link layer, the input clock and data signal being transferred from the PHY layer to the link layer.

11. A method for providing a clock input and a data input synchronously between a link layer and a PHY layer, the link layer including a transmit clock domain and a receive clock domain, the PHY layer including a transmit clock domain and a receive clock domain, comprising the steps of:
   receiving the clock input;
   receiving the data input;
   transmitting the clock input from one of the link layer and the PHY layer to a latching device for triggering the data input;
   sending the clock input through a buffer, the buffer having a delay which is equal to the delay through the latching device; and
   generating an output data from the latching device that synchronizes with an output clock from the buffer.

12. The method of claim 11 wherein the transmitting step comprises transmitting the clock input from the link layer to the PHY layer.

13. The method of claim 11 wherein the transmitting step comprises transmitting the clock input from the PHY layer to the link layer.

14. The method of claim 11 further comprising the step of using the output clock from the buffer as a receive clock input at the PHY layer.

15. The method of claim 11 further comprising the step of absorbing the reflection generated from the data input by serial termination.

16. The method of claim 11 further comprising the step of absorbing the reflection generated from the data input by parallel termination.

17. The method of claim 11 further comprising generating control signals for the data input, the control signals being multiplexed with the data input.

18. The method of claim 11, wherein the link layer is an Asynchronous Transfer Mode (ATM) layer.

19. A source synchronous clocking system, comprising:
a source clock domain in a first network protocol layer, comprising:
a register having a first input for receiving a data signal, a second input for receiving a clock signal, and an output; and
a buffer having an: input for receiving the clock signal and an output, said buffer generating a delay that is substantially equivalent to a delay through said register;
a destination clock domain in a second network protocol layer, comprising:
a register having a first input and a second input, the first input of said register of said destination clock domain being coupled to the output of said register in the source clock domain; and
a delay circuit, coupled between said source clock domain and said destination clock domain, for introducing additional delay to the clock signal.

20. The source synchronous clocking system of claim 19 further comprising a second buffer having an input coupled to an output of said delay circuit and an output coupled to said register in said destination clock domain.

21. The source synchronous clocking system of claim 20 wherein the clock signal generated from the output of the second buffer is connected to a clock input of said destination clock domain.

22. A method for providing a clock input and a data input synchronously between a link layer and a PHY layer, the link layer including a transmit clock domain and a receive clock domain, the PHY layer including a transmit clock domain and a receive clock domain, comprising the steps of:
receiving the clock input;
receiving the data input;
transmitting the clock input to a latching device for triggering the data input;
sending the clock input through a buffer, the buffer having a delay which is equal to the delay through the latching device;
generating an output data from the latching device that synchronizes with an output clock from the buffer, wherein the output data is transmitted to one of: the link layer and PHY layer; and
generating control signals for the data input, the control signals being multiplexed with the data input.

* * * * *